(12) United States Patent  
Sasaki et al.

(10) Patent No.: US 9,179,049 B2  
(45) Date of Patent: Nov. 3, 2015

(54) OPTICAL DEVICE AND SINGLE LENS REFLEX CAMERA

(71) Applicants: Naohito Sasaki, Tokyo (JP); Isamu Hirai, Tokyo (JP)

(72) Inventors: Naohito Sasaki, Tokyo (JP); Isamu Hirai, Tokyo (JP)

(73) Assignee: RICOH IMAGING COMPANY, LTD., Tokyo (JP)

( * ) Notice: Subject to any disclaimer, the term of this patent is extended or adjusted under 35 U.S.C. 154(b) by 21 days.

(21) Appl. No.: 14/108,586

(22) Filed: Dec. 17, 2013

(65) Prior Publication Data

US 2014/0168499 A1 Jun. 19, 2014

(30) Foreign Application Priority Data

Dec. 18, 2012 (JP) ................. 2012-275417

(51) Int. Cl.
| | |
|---|---|
| H04N 5/225 | (2006.01) |
| H04N 5/232 | (2006.01) |
| G02B 5/20 | (2006.01) |
| G03B 13/06 | (2006.01) |
| G03B 17/20 | (2006.01) |
| G02B 5/04 | (2006.01) |
| G03B 19/12 | (2006.01) |

(52) U.S. Cl.
CPC ............... H04N 5/2251 (2013.01); G02B 5/20 (2013.01); G03B 13/06 (2013.01); G03B 17/20 (2013.01); H04N 5/23293 (2013.01); G02B 5/04 (2013.01); G03B 19/12 (2013.01)

(58) Field of Classification Search
USPC ................... 348/341; 396/296, 373, 385, 386
See application file for complete search history.

(56) References Cited

U.S. PATENT DOCUMENTS

| | | | | |
|---|---|---|---|---|
| 5,754,900 | A * | 5/1998 | Suda .............................. | 396/296 |
| 6,085,042 | A * | 7/2000 | Yamamoto .................... | 396/121 |
| 6,292,629 | B1 * | 9/2001 | Sensui ......................... | 396/147 |
| 7,636,520 | B2 * | 12/2009 | Kaneko et al. ............... | 396/296 |
| 2007/0009255 | A1 * | 1/2007 | Iwane .......................... | 396/296 |

FOREIGN PATENT DOCUMENTS

| | | |
|---|---|---|
| JP | 05-127244 | 5/1993 |
| JP | 2000-089336 | 3/2000 |
| JP | 2002-082278 | 3/2002 |

* cited by examiner

*Primary Examiner* — Albert Cutler

(74) *Attorney, Agent, or Firm* — Frommer Lawrence & Haug LLP

(57) ABSTRACT

An optical device for forming an image of an object, comprising: a semitransparent mirror surface disposed on an optical path of the image of the object; and a light projection unit configured to project light to the semitransparent mirror surface and thereby to combine, on the optical path, the projected light transmitting through the semitransparent mirror surface with the image of the object reflecting from the semitransparent mirror surface, wherein: a first wavelength region is defined in a visible light region to include a wavelength of the projected light; the semitransparent mirror surface has a substantially flat reflectance property within a second wavelength region which is defined in the visible light region not to include the first wavelength region; and transmissivity of the semitransparent mirror surface at the wavelength of the projected light is higher by 10% to 50% than transmissivity in the second wavelength region.

20 Claims, 12 Drawing Sheets

| CONFIGURATION | MATERIAL | REFRACTIVE INDEX | PHYSICAL FILM THICKNESS[nm] |
|---|---|---|---|
| OUTPUT SIDE MEDIUM | AIR | 1.000 | — |
| 1 | SiO2 | 1.469 | 74.80 |
| 2 | TiO2 | 2.347 | 80.31 |
| 3 | SiO2 | 1.469 | 134.73 |
| 4 | TiO2 | 2.347 | 69.52 |
| 5 | SiO2 | 1.469 | 146.00 |
| 6 | TiO2 | 2.347 | 78.10 |
| 7 | SiO2 | 1.469 | 98.73 |
| 8 | TiO2 | 2.347 | 75.39 |
| 9 | SiO2 | 1.469 | 41.88 |
| 10 | TiO2 | 2.347 | 55.68 |
| 11 | SiO2 | 1.469 | 98.86 |
| 12 | TiO2 | 2.347 | 57.33 |
| 13 | SiO2 | 1.469 | 50.68 |
| 14 | TiO2 | 2.347 | 29.69 |
| 15 | SiO2 | 1.469 | 66.50 |
| 16 | TiO2 | 2.347 | 10.96 |
| 17 | SiO2 | 1.469 | 141.04 |
| 18 | TiO2 | 2.347 | 15.89 |
| INPUT SIDE MEDIUM | BK7 | 1.518 | — |

| CONFIGURATION | MATERIAL | REFRACTIVE INDEX | PHYSICAL FILM THICKNESS[nm] |
|---|---|---|---|
| OUTPUT SIDE MEDIUM | AIR | 1.000 | — |
| 1 | SiO2 | 1.469 | 64.53 |
| 2 | TiO2 | 2.347 | 70.72 |
| 3 | SiO2 | 1.469 | 142.76 |
| 4 | TiO2 | 2.347 | 81.64 |
| 5 | SiO2 | 1.469 | 131.84 |
| 6 | TiO2 | 2.347 | 69.74 |
| 7 | SiO2 | 1.469 | 98.73 |
| 8 | TiO2 | 2.347 | 76.33 |
| 9 | SiO2 | 1.469 | 71.38 |
| 10 | TiO2 | 2.347 | 80.92 |
| 11 | SiO2 | 1.469 | 22.53 |
| 12 | TiO2 | 2.347 | 77.32 |
| 13 | SiO2 | 1.469 | 93.70 |
| 14 | TiO2 | 2.347 | 47.02 |
| 15 | SiO2 | 1.469 | 84.83 |
| 16 | TiO2 | 2.347 | 24.20 |
| 17 | SiO2 | 1.469 | 71.26 |
| 18 | TiO2 | 2.347 | 56.47 |
| 19 | SiO2 | 1.469 | 16.55 |
| 20 | TiO2 | 2.347 | 72.70 |
| INPUT SIDE MEDIUM | BK7 | 1.518 | — |

| CONFIGURATION | MATERIAL | REFRACTIVE INDEX | PHYSICAL FILM THICKNESS[nm] |
|---|---|---|---|
| OUTPUT SIDE MEDIUM | AIR | 1.000 | — |
| 1 | SiO2 | 1.469 | 63.94 |
| 2 | TiO2 | 2.347 | 70.23 |
| 3 | SiO2 | 1.469 | 143.48 |
| 4 | TiO2 | 2.347 | 82.05 |
| 5 | SiO2 | 1.469 | 130.54 |
| 6 | TiO2 | 2.347 | 70.05 |
| 7 | SiO2 | 1.469 | 98.73 |
| 8 | TiO2 | 2.347 | 79.63 |
| 9 | SiO2 | 1.469 | 53.52 |
| 10 | TiO2 | 2.347 | 83.05 |
| 11 | SiO2 | 1.469 | 24.65 |
| 12 | TiO2 | 2.347 | 76.60 |
| 13 | SiO2 | 1.469 | 96.80 |
| 14 | TiO2 | 2.347 | 48.69 |
| 15 | SiO2 | 1.469 | 89.78 |
| 16 | TiO2 | 2.347 | 20.17 |
| 17 | SiO2 | 1.469 | 83.44 |
| 18 | TiO2 | 2.347 | 45.42 |
| 19 | SiO2 | 1.469 | 26.57 |
| 20 | TiO2 | 2.347 | 71.41 |
| INPUT SIDE MEDIUM | BK7 | 1.518 | — |

| CONFIGURATION | MATERIAL | REFRACTIVE INDEX | PHYSICAL FILM THICKNESS[nm] |
|---|---|---|---|
| OUTPUT SIDE MEDIUM | AIR | 1.000 | — |
| 1 | SiO2 | 1.469 | 80.54 |
| 2 | TiO2 | 2.347 | 77.74 |
| 3 | SiO2 | 1.469 | 152.76 |
| 4 | TiO2 | 2.347 | 71.81 |
| 5 | SiO2 | 1.469 | 138.24 |
| 6 | TiO2 | 2.347 | 83.58 |
| 7 | SiO2 | 1.469 | 98.73 |
| 8 | TiO2 | 2.347 | 93.15 |
| 9 | SiO2 | 1.469 | 128.40 |
| 10 | TiO2 | 2.347 | 34.82 |
| 11 | SiO2 | 1.469 | 199.67 |
| 12 | TiO2 | 2.347 | 45.94 |
| 13 | SiO2 | 1.469 | 85.02 |
| 14 | TiO2 | 2.347 | 20.30 |
| 15 | SiO2 | 1.469 | 259.35 |
| 16 | TiO2 | 2.347 | 26.49 |
| 17 | SiO2 | 1.469 | 65.83 |
| 18 | TiO2 | 2.347 | 67.36 |
| 19 | SiO2 | 1.469 | 96.84 |
| 20 | TiO2 | 2.347 | 51.18 |
| 21 | SiO2 | 1.469 | 95.41 |
| 22 | TiO2 | 2.347 | 50.89 |
| 23 | SiO2 | 1.469 | 110.38 |
| 24 | TiO2 | 2.347 | 36.10 |
| 25 | SiO2 | 1.469 | 156.62 |
| 26 | TiO2 | 2.347 | 17.59 |
| INPUT SIDE MEDIUM | BK7 | 1.518 | — |

| CONFIGURATION | MATERIAL | REFRACTIVE INDEX | PHYSICAL FILM THICKNESS[nm] |
|---|---|---|---|
| OUTPUT SIDE MEDIUM | AIR | 1.000 | — |
| 1 | MgF2 | 1.388 | 89.19 |
| 2 | TiO2 | 2.347 | 102.25 |
| 3 | SiO2 | 1.469 | 189.84 |
| 4 | TiO2 | 2.347 | 102.46 |
| 5 | MgF2 | 1.388 | 154.94 |
| 6 | TiO2 | 2.347 | 87.02 |
| 7 | SiO2 | 1.469 | 98.73 |
| 8 | TiO2 | 2.347 | 92.94 |
| 9 | MgF2 | 1.388 | 101.12 |
| 10 | TiO2 | 2.347 | 78.72 |
| 11 | SiO2 | 1.469 | 153.65 |
| 12 | TiO2 | 2.347 | 42.75 |
| 13 | MgF2 | 1.388 | 62.68 |
| 14 | TiO2 | 2.347 | 53.19 |
| 15 | SiO2 | 1.469 | 90.00 |
| 16 | TiO2 | 2.347 | 67.24 |
| 17 | MgF2 | 1.388 | 45.91 |
| 18 | TiO2 | 2.347 | 68.92 |
| INPUT SIDE MEDIUM | BK7 | 1.518 | — |

| CONFIGURATION | MATERIAL | REFRACTIVE INDEX | PHYSICAL FILM THICKNESS [nm] |
|---|---|---|---|
| OUTPUT SIDE MEDIUM | AIR | 1.000 | — |
| 1 | SiO2 | 1.469 | 72.50 |
| 2 | TiO2 | 2.347 | 75.52 |
| 3 | SiO2 | 1.469 | 136.16 |
| 4 | TiO2 | 2.347 | 68.82 |
| 5 | SiO2 | 1.469 | 120.72 |
| 6 | TiO2 | 2.347 | 69.89 |
| 7 | SiO2 | 1.469 | 98.73 |
| 8 | TiO2 | 2.347 | 87.77 |
| 9 | SiO2 | 1.469 | 33.45 |
| 10 | TiO2 | 2.347 | 48.46 |
| 11 | SiO2 | 1.469 | 97.97 |
| 12 | TiO2 | 2.347 | 59.73 |
| 13 | SiO2 | 1.469 | 37.06 |
| 14 | TiO2 | 2.347 | 49.71 |
| 15 | SiO2 | 1.469 | 70.40 |
| 16 | TiO2 | 2.347 | 10.84 |
| INPUT SIDE MEDIUM | BK7 | 1.518 | — |

| CONFIGURATION | MATERIAL | REFRACTIVE INDEX | PHYSICAL FILM THICKNESS[nm] |
|---|---|---|---|
| OUTPUT SIDE MEDIUM | AIR | 1.000 | — |
| 1 | SiO2 | 1.469 | 68.38 |
| 2 | TiO2 | 2.347 | 75.61 |
| 3 | SiO2 | 1.469 | 137.84 |
| 4 | TiO2 | 2.347 | 73.31 |
| 5 | SiO2 | 1.469 | 122.86 |
| 6 | TiO2 | 2.347 | 71.12 |
| 7 | SiO2 | 1.469 | 98.73 |
| 8 | TiO2 | 2.347 | 72.82 |
| 9 | SiO2 | 1.469 | 93.57 |
| 10 | TiO2 | 2.347 | 77.81 |
| 11 | SiO2 | 1.469 | 17.87 |
| 12 | TiO2 | 2.347 | 72.50 |
| 13 | SiO2 | 1.469 | 98.54 |
| 14 | TiO2 | 2.347 | 47.86 |
| 15 | SiO2 | 1.469 | 76.93 |
| 16 | TiO2 | 2.347 | 19.80 |
| 17 | SiO2 | 1.469 | 128.38 |
| 18 | TiO2 | 2.347 | 36.50 |
| 19 | SiO2 | 1.469 | 47.44 |
| 20 | TiO2 | 2.347 | 29.09 |
| INPUT SIDE MEDIUM | BK7 | 1.518 | — |

OPTICAL DEVICE AND SINGLE LENS REFLEX CAMERA

BACKGROUND OF THE INVENTION

The present invention relates to an optical device such as a finder device capable of displaying supplementary information in a finder view in a superimposing manner, and a single lens reflex camera on which the finder device is mounted.

In a finder of a single lens reflex camera, a subject image formed on a focusing screen is observed, for example, through a pentaprism. On the subject image thus observed through the finder, information for supplementing the photographing, such as ranging points and ranging areas, is superimposed. Examples of a specific configuration of the finder device capable of superimposing information of this type are described, for example, in Japanese Patent Provisional Publications Nos. HEI 05-127244A (hereafter, referred to as patent document 1), 2002-82278A (hereafter, referred to as patent document 2) and 2000-89336A (hereafter, referred to as patent document 3).

The patent document 1 describes a configuration capable of changing information superimposed on a subject image by controlling orientation of a transmissive liquid crystal disposed in a finder optical system. Each of the patent documents 2 and 3 describes a configuration where ranging information and the like is superimposed on a subject image being observed through the finder, by letting LED (Light Emitting Diode) light representing the ranging information and the like formed by an LED and a mask member enter a pentaprism via a condenser lens and a prism.

SUMMARY OF THE INVENTION

However, the finder device described in the patent document 1 has a drawback that loss of light amount caused when light transmits through the transmissive liquid crystal is large, and therefore the subject image in the finder view becomes dark. Furthermore, since superimposed information is represented by a difference in brightness and darkness (i.e., display/nondisplay) of a liquid crystal pattern, a degree of visibility of the superimposed information is low.

Regarding the finder device described in the patent document 2, a third reflection surface of the pentaprism into which the LED light enters is formed as a half mirror. Therefore, the LED light can be guided to the finder by letting the LED light enter the pentaprism through the third reflection surface, and a subject light beam propagating through the pentaprism can be guided to the finder by letting the subject light beam be reflected from the third reflection surface. In this configuration, the brightness of the subject image in the finder view can be increased by increasing the reflectance of the third reflection surface; however, since in this case the transmissivity of the third reflection surface decreases, the brightness of the superimposed information decreases. On the other hand, when the transmissivity of the third reflection surface is increased to enhance the brightness of the superimposed information, the reflectance of the third reflection surface decreases and thereby the subject image in the finder view becomes dark. That is, since, in the configuration described in the patent document 2, the brightness of the subject image and the brightness of the superimposed information in the finder view are in a tradeoff relationship, it is impossible to independently improve one of the above described two types of brightness and to simultaneously improve the two types of brightness.

In view of these circumstances, the finder device described in the patent document 3 is configured such that, in order to prevent the brightness of the subject image in the finder view from decreasing, the reflectance of a peripheral region of the third reflection surface through which the LED light does not need to transmit is set higher (or is formed to be a mirror surface with a metal film) than the reflectance of a central region of the third reflection surface through which the LED light needs to transmit. However, in this case, the difference in brightness is caused between the central region and the peripheral region in the finder view, and therefore it is impossible to fundamentally improve the brightness of the subject image in the finder view.

The present invention is advantageous in that it provides an optical device and a single lens reflex camera capable of improving both of the brightness of a subject image and the brightness of information combined with the subject image.

According to an aspect of the invention, there is provided an optical device for forming an image of an object. The optical device comprises: a semitransparent mirror surface disposed on an optical path along which light of the image of the object proceeds; and a light projection unit configured to project light to the semitransparent mirror surface and thereby to combine, on the optical path, the light projected by the light projection unit and transmitting through the semitransparent mirror surface with the image of the object reflecting from the semitransparent mirror surface. In this configuration, a first wavelength region is defined in a visible light region to include a wavelength of the light projected by the light projection unit. The semitransparent mirror surface has a substantially flat reflectance property within a second wavelength region which is defined in the visible light region not to include the first wavelength region. Transmissivity of the semitransparent mirror surface at the wavelength of the light projected by the light projection unit is higher by 10% to 50% than transmissivity in the second wavelength region.

With this configuration, it becomes possible to independently improve the brightness of the image of the object and the brightness of the combined information, and thereby to simultaneously improve the brightness of the image of the object and the brightness of the combined information.

Average reflectance of the second wavelength region may be 70% to 95%.

A reflectance property of the semitransparent mirror surface in the first wavelength region may have a valley at the wavelength corresponding to the light projected by the light projection unit, an inflection point on a shorter wavelength side with respect to the valley and an inflection point on a longer wavelength side with respect to the valley. The first wavelength region may be defined such that a lower limit is a wavelength corresponding to the inflection point on the shorter wavelength side and an upper limit is a wavelength corresponding to the inflection point on the longer wavelength side.

The optical device may be configured as a finder device comprising an erecting optical system that has a plurality of reflection surfaces on the optical path along which the light of the image of the object proceeds. In this case, the erecting optical system may be configured such that: one of the plurality of reflection surfaces is defined as the semitransparent mirror surface; and the image of the object entering the finder device from an objective optical system is guided, as an erect image, to a finder by letting the image of the object entering the finder device from the objective optical system reflect from each of the plurality of reflection surfaces.

The erecting optical system may comprise a pentaprism. In this case, the light projection unit is configured to let the light projected by the light projection unit enter the pentaprism via the semitransparent mirror surface and thereby to let the light projected by the light projection unit be combined with the erect image being guided to the finder in the pentaprism.

The pentaprism may comprises: an entrance surface on which an object light beam from the objective optical system is incident; a dach surface that reflects the object light beam being incident on the entrance surface; and a third reflection surface which reflects, toward the finder, the object light beam reflected by the dach surface. The third reflection surface is the semitransparent mirror surface.

According to another aspect of the invention, there is provided an optical device for forming an image of an object. The optical device comprises: a semitransparent mirror surface disposed on an optical path along which light of the image of the object proceeds; and a light projection unit configured to project light to the semitransparent mirror surface and thereby to combine, on the optical path, the light projected by the light projection unit and reflecting from the semitransparent mirror surface with the image of the object transmitting through the semitransparent mirror surface. In this configuration, a first wavelength region is defined in a visible light region to include a wavelength of the light projected by the light projection unit. The semitransparent mirror surface has a substantially flat transmissivity property within a second wavelength region which is defined in the visible light region not to include the first wavelength region. Reflectance of the semitransparent mirror surface at the wavelength of the light projected by the light projection unit is higher by 10% to 50% than reflectance in the second wavelength region.

With this configuration, it becomes possible to independently improve the brightness of the image of the object and the brightness of the superimposed information, and thereby to simultaneously improve the brightness of the image of the object and the brightness of the superimposed information.

Average transmissivity of the second wavelength region may be 70% to 95%.

In the above described two aspects of the invention, the first wavelength region may have a width of 20 nm to 150 nm.

Transmissivity of the first wavelength region may have a half-value width of 10 nm to 100 nm.

The semitransparent mirror surface may be formed by forming a dielectric multilayer film.

The optical device may be configured as a finder device. In this case, an image combined by the light projected by the light projection unit on the image of the object may represent supplementary information concerning photographing.

The supplementary information concerning photographing may include information concerning a ranging point, an in-focus state and an in-focus position.

According to another aspect of the invention there is provided a single lens reflex camera, comprising: an objective optical system; and one of the above described optical devices.

BRIEF DESCRIPTION OF THE ACCOMPANYING DRAWINGS

DETAILED DESCRIPTION OF THE EMBODIMENTS

Hereinafter, an embodiment according to the invention are described with reference to the accompanying drawings.

General Configuration of Photographing Device

Figure 1:
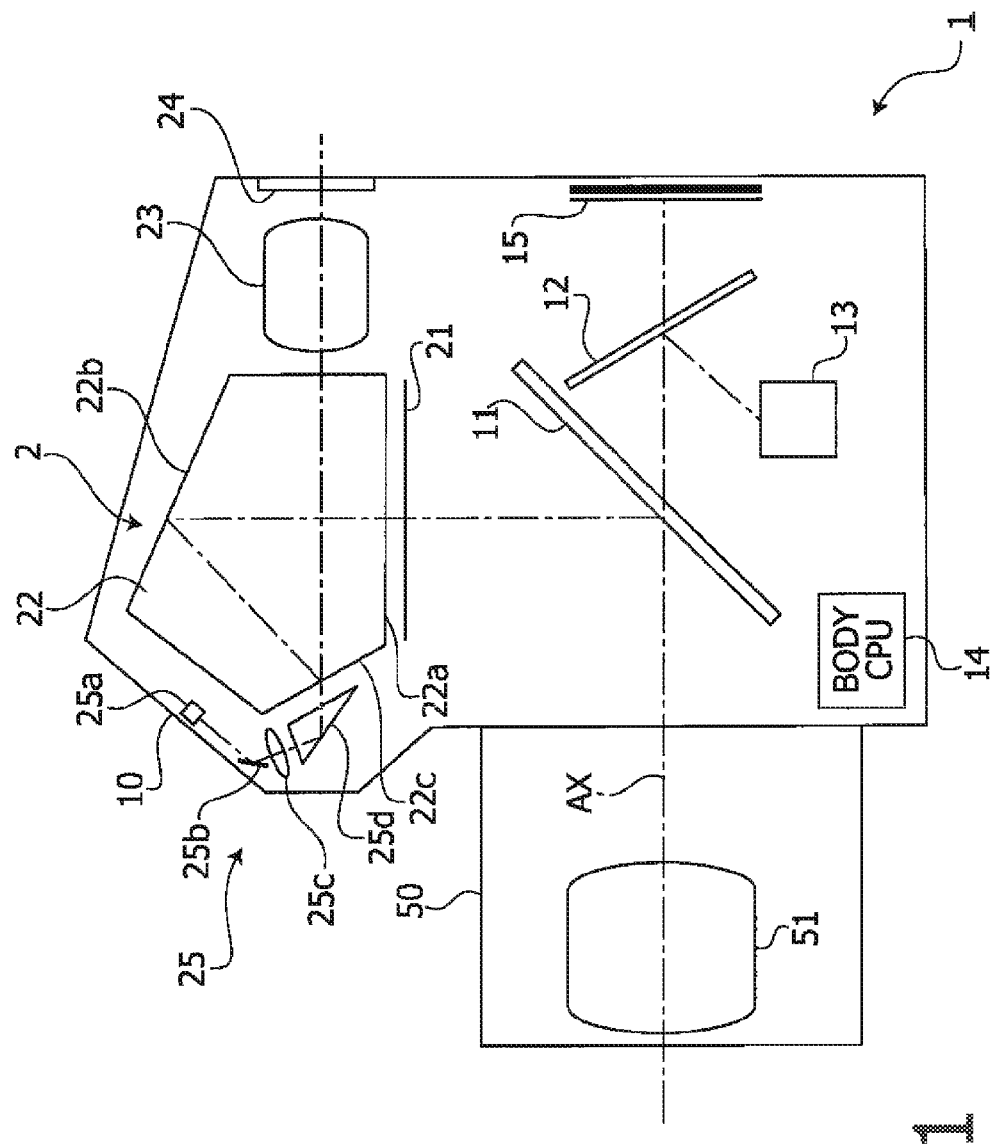
FIG. 1 is a block diagram illustrating a configuration of a photographing device on which a finder device according to an embodiment of the invention is mounted.

FIG. 1 is a block diagram illustrating a configuration of a photographing device 1 according to an embodiment. As shown in FIG. 1, the photographing device 1 according to the embodiment is a digital single lens reflex camera (having a quick return mirror) on which a finder device 2 is mounted. The photographing device 1 includes a camera body 10 and an interchangeable lens 50 which is detachable attachable to the camera body 10. A light beam from a subject (a subject light beam) passes through a photographing lens 51 in the interchangeable lens 50, and is reflected toward the finder device 1 by a main mirror 11 provided in the camera body 10. A part of the main mirror 11 is formed as a half mirror region. Therefore, a part of the subject light beam is reflected downward by a sub mirror 12 provided on the rear side of the main mirror 11 after passing through the main mirror 11 (the half mirror region), and is incident on an automatic focus detection module 13.

The automatic focus detection module 13 detects a focusing state of the subject, and outputs a signal corresponding to a detection result, to a body CPU 14. The body CPU 14 executes defocus calculation based on the signal inputted from the automatic focus detection module 13, and performs focusing of the photographing lens 51 based on a defocus amount obtained by the calculation. In FIG. 1, electric wiring between components is omitted for the sake of simplicity.

When a release switch (not shown) is pressed, the body CPU 14 controls the main mirror 11 to make a quick return motion. That is, the body CPU 14 causes the main mirror 11 to retract from an optical path extending in parallel with an optical axis AX of the photographing lens 51, by lifting up the main mirror 11 only in a time period from a time immediately before running of a front shutter curtain of a focal plane shutter (not shown) and immediately after running of a rear shutter curtain of the focal plane shutter. The sub mirror 12 is configured to move in mechanical conjunction with the main mirror 11, and retracts from the optical path together with the lifting up motion of the main mirror 11. Therefore, after the subject light beam has passed through the photographing lens 51, the subject light beam is converged onto an imaging surface of an image sensor 15. The image sensor 15 is, for example, a CCD (Charge Coupled Device) image sensor or a CMOS (Complementary Metal Oxide Semiconductor) image sensor, and is configured to accumulate charges according to the light amount of an optical image formed on each pixel on the imaging surface and to convert the optical image into an image signal. The converted image signal is processed by an image processing circuit (not shown) to be displayed on a monitor. A photographer is able to visually recognize a photographing image through an LCD monitor (not shown) provided on a back surface of the camera body 10.

Configuration of Finder Device

As described above, during a time period in which the main mirror 11 is not retracted from the optical path, the subject light beam reflected from the main mirror 11 is incident on the finder device 2. The finder device 2 includes a diffusion plate (a focusing screen) 21, a pentaprism 22, an eyepiece 23, a finder 24 and a superimposing unit 25.

The diffusion plate 21 is disposed at a position optically equivalent to the position of the imaging surface of the image sensor 15, and the subject light beam which has passed through the photographing lens 51 converges thereon.

The pentaprism 22 has a plurality of reflection surfaces, and forms an erect image by letting each reflection surface reflect the subject image which has been formed on the diffusion plate 21 and has entered the pentaprism 22. More specifically, the pentaprism 22 has an input surface 22a, a dach surface 22b and the third reflection surface 22c. In the pentaprism 22, the subject image which has entered the pentaprism 22 is reflected sequentially by the dach surface 22b and the third reflection surface 22c to be inversed, and is outputted toward the eyepiece 23 as the erect image.

The eyepiece 23 is configured to converge again the subject image, formed on the diffusion plate 21 and erected by the pentaprism 22, as a virtual image adapted for observation by the photographer.

The photographer is able to observe the subject image (a virtual image) formed again by the eyepiece 23 through the finder 24.

The superimposing unit 25 includes a light emission unit 25a, a mirror 25b, a condenser lens 25c and a prism 25d. The light emission unit 25a has a plurality of LEDs (Light Emitting Diodes) functioning as light emission devices. The light emission unit 25a includes a mask member corresponding to superimposing display on the front side of the LEDs. Superimposing light corresponding to various types of superimposing display is emitted by the light emission unit 25a by controlling light emission of each LED by the body CPU 14. The superimposed information is principally information assisting the photographing, and is, for example, ranging points, an in-focus state and an in-focus position. The superimposing light emitted from the light emission unit 25a is reflected by the mirror 25b and is converged by the condenser lens 25c, and is incident on the prism 25d. The superimposing light incident on the prism 25d is reflected in the prism 25d, and is incident on the third reflection surface 22c of the pentaprism 22.

The third reflection surface 22c is a half mirror surface (i.e., a semitransparent mirror surface) on which a dielectric multilayer film is formed. The third reflection surface 22c is configured such that, by letting light, reflected by each interface of a high refractive index material and a low refractive index material which are alternately laminated, interferes with each other, a particular spectral property is obtained in the visible light region. The spectral property of the third reflection surface 22c is determined in accordance with a combination of refractive indexes of film materials, the number of lamination layers and the thicknesses of layers.

The superimposing light is incident on the pentaprism 22 after passing through the third reflection surface 22c. The superimposing light which has entered the pentaprism 22 proceeds in the pentaprism 22 toward the eyepieces 23 in a state where the superimposing light is overlapped with the erect image reflected by the third reflection surface 22c and guided to the eyepiece 23, and reaches the finder 24 via the eyepiece 23. With this configuration, the photographer is able to observe, through the finder 24, the subject image on which the ranging points and etc. are superimposed.

Conventionally, in a configuration where superimposing light enters a pentaprism via a half mirror surface of the pentaprism, it was impossible to simultaneously improve the brightness of a subject image in a finder view and the brightness of superimposed information. By contrast, as described in detail below, the finder device 2 according to the embodiment is configured such that the third reflection surface 22c has a flat reflectance property in a major part of the visible light region and has a wavelength region corresponding to the superimposing light where the reflectance decreases locally relative to the other region (i.e., the transmissivity increases locally relative to the other region). With this configuration, it becomes possible to independently improve both of the brightness of the subject image and the brightness of the superimposed information while suppressing change of color of the subject image in the tinder view, and thereby it becomes possible to simultaneously improve the both types of brightness.

Configuration of Third Reflection Surface

Figure 2A:
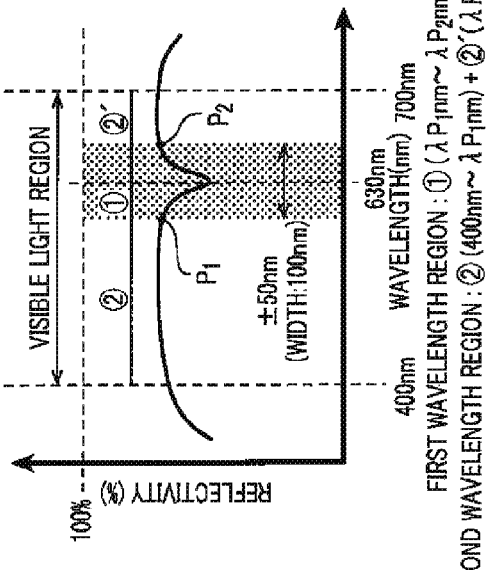
FIG. 2A is a graph illustrating reflectance of a third reflection surface of a pentaprism provided in the finder device.
Figure 2B:
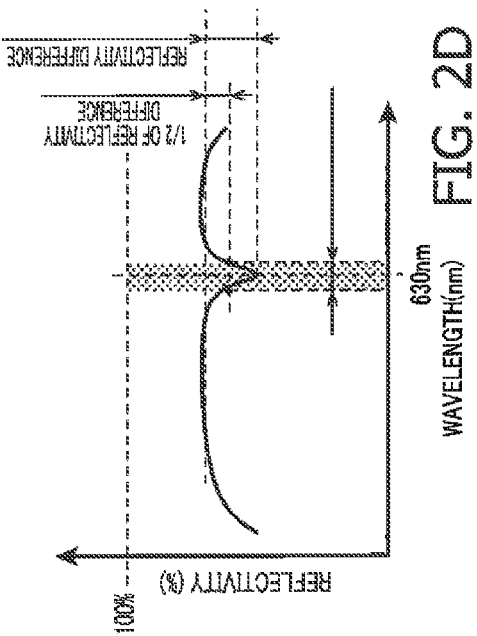
FIGS. 2B, 2C and 2D are explanatory illustrations for explaining various definitions regarding the third reflection surface.
Figure 2C:
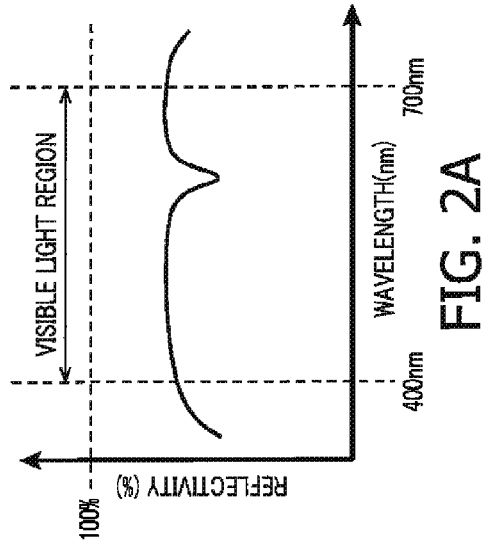
Figure 2D:
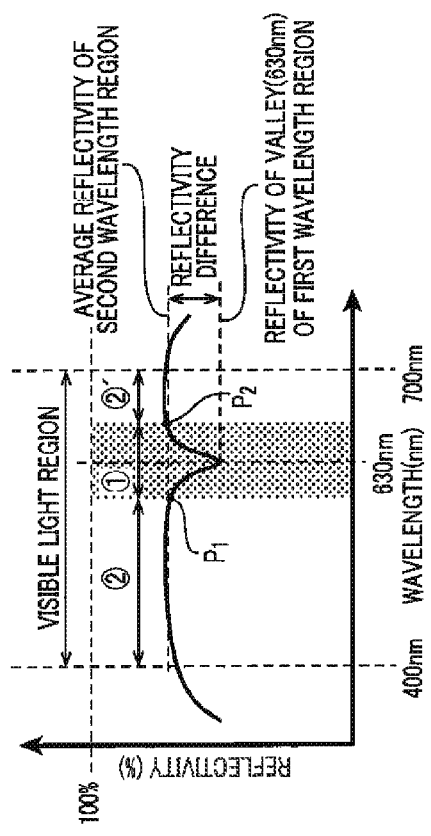

FIG. 2A is a graph illustrating reflectance of the third reflection surface 22c. In FIG. 2A, the vertical axis represents the reflectance (unit: %), and the horizontal axis represents the wavelength (unit: nm), FIGS. 2B to 2D are explanatory illustrations for explaining various definitions regarding the third reflection surface 22c. As in the case of FIG. 2A, in each of FIGS. 2B to 2D, the vertical axis represents the reflectance (unit: %), and the horizontal axis represents the wavelength (unit: nm). The absorption of the third reflection surface 22c is extremely small, and can be neglected. Therefore, the spectral property of the third reflection surface 22c is defined as reflectance+transmissivity=100%.

As shown in FIG. 2A, the third reflection surface 22c has a flat reflectance property over the entire wavelength region (hereafter referred to as a "second wavelength region") except a partial wavelength region (hereafter, referred to as "first wavelength region") within the visible light region (400 nm to 700 nm). The flatness of the reflectance property can be defined by introducing, for example, the idea of arithmetic mean estimation Ra. Specifically, within a targeted wavelength range (hereafter, referred to as "target wavelength range"), absolute values of deviations between "reflectance" and "the average reflectance within the target wavelength range" are averaged. By this averaged value, the degree of average unevenness of the reflectance of the third reflection surface $22c$ can be objectively represented. As the averaged value becomes smaller, the degree of flatness property increases, which means that the reflectance property becomes closer to the flat shape. Regarding the reflectance property of the third reflection surface $22c$, when the target wavelength range is $\lambda 0$ to $\lambda 1$, the reflectance at a wavelength $\lambda$ within the target wavelength range $\lambda 0$ to $\lambda 1$ is defined as $F(\lambda)$, the average of the spectral reflectance in the target wavelength range $\lambda 0$ to $\lambda 1$ is defined as $F_{average}$, and the absolute value of the deviation between $F(\lambda)$ and $F_{average}$ is defined as $|F(\lambda)-F_{average}|$, the mean R of $|F(\lambda)-F_{average}|$ within the wavelength range $\lambda 0$ to $\lambda 1$ is a value obtained by dividing the integrated value of the $|F(\lambda)-F_{average}|$ in the wavelength range $\lambda 0$ to $\lambda 1$ by the wavelength width $\lambda 1-\lambda 0$ of the target wavelength range and is expressed by the following expression.

$$R = \frac{1}{\lambda_1 - \lambda_0} \int_{\lambda_0}^{\lambda_1} |F(\lambda) - F_{average}| d\lambda$$

In the case where it is desired to enable an observer to precisely recognize color of a subject as in the case of a finder optical path of a camera, a half mirror on the optical path is required not to change color of the subject after target light reflects from or passes through the half mirror. For this reason, the half mirror is designed such that the mean R is lower than or equal to 5% so that the spectral property has a high degree of flatness within the visible light region. In this specification, the wordings "the property of reflectance or transmissivity is flat" means "the mean R is lower than or equal to 5%".

As shown in FIG. 2B, the first wavelength region is a wavelength region having a width defined by a pair of inflection points $P_1$ and $P_2$ sandwiching a valley of the reflectance property (i.e., a peak of the transmissivity property, and specifically is the wavelength of 630 nm). The wavelength 630 nm corresponds to the superimposing light emitted by the light emission unit $25a$. That is, the third reflection surface $22c$ has a higher degree of transmissivity for the superimposing light than the other wavelengths.

Figure 11:
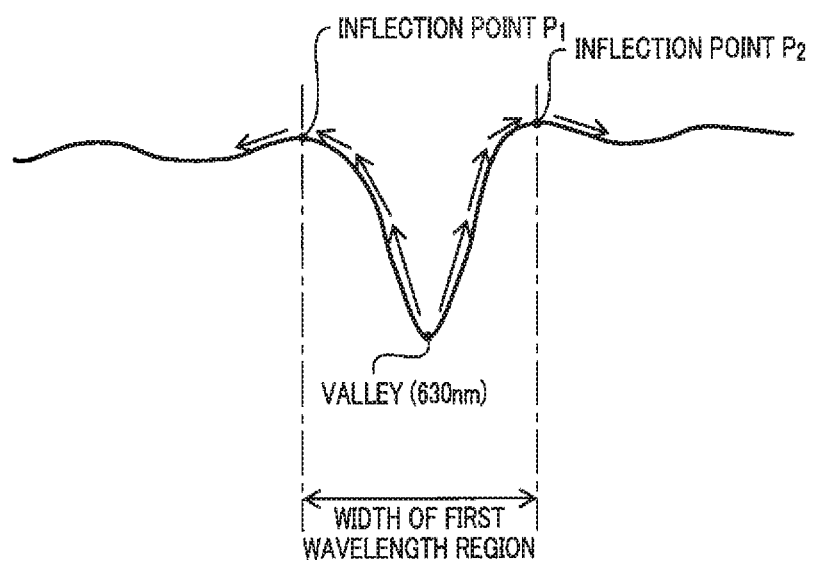
FIG. 11 is an explanatory illustration for explaining a first wavelength region of the third reflection surface according to the embodiment of the invention.

FIG. 11 is an explanatory illustration for explaining the first wavelength region. As shown in FIG. 11, the reflectance increases as a point on the property starting from the valley of the first wavelength region (630 nm) gets away from the valley toward the shorter wavelength side, and then the property becomes flat. When the reflectance property moves to the flat region, the rate of change takes a value of zero at the inflection point $P_1$ while gradually decreasing the rate of change (the increasing rate), and decreases slightly immediately after the point passes the inflection point $P_1$. After the point on the reflectance property passes the inflection point $P_1$ and then slightly decreases, fluctuation (increase and decrease) within an extremely small range occurs repeatedly. Thus, after the point on the reflectance property passes the inflection point $P_1$ (on the shorter wavelength side with respect to the inflection point $P_1$), the reflectance property moves to the region (flat region) where the reflectance property repeats the fluctuation within an extremely small range.

In this embodiment, the wavelength $\lambda P_1$ corresponding to the inflection point $P_1$ at which the sign of the inclination of the change of reflectance changes is set to the lower limit of the first wavelength region. The reflectance also increases gradually when the point on the reflectance property moves away toward the longer wavelength side starting from the valley (the wavelength of 630 nm) of the first wavelength region, and then the reflectance property moves to the flat region. When the reflectance property moves to the flat region, the reflectance takes the rate of change of zero at the inflection point $P_2$ while gradually decreasing the rate of change (the increasing rate), and then decreases by a extremely small amount immediately after passing the inflection point $P_2$. After the reflectance decreases by an extremely small amount while passing the inflection point $P_2$, the reflectance property repeats the fluctuation (increase and decrease) within an extremely small range. Thus, when the reflectance property passes the inflection point $P_2$ (i.e., on the longer wavelength side with respect to the inflection point $P_2$), the reflectance property moves to the region (a flat region) where the fluctuation within an extremely small range repeats. In this embodiment, the wavelength $\lambda P_2$ corresponding to the inflection point $P_2$ at which the sign of the inclination of change of the reflectance changes is defined as the upper limit of the first wavelength region.

As described above, the first wavelength region is a wavelength region from the wavelength $\lambda P_1$ corresponding to the inflection point $P_1$ to the wavelength $\lambda P_2$ corresponding to the inflection point $P_2$. As described above, the second wavelength region is defined as the entire wavelength region in the visible light region except the first wavelength region. Therefore, the second wavelength region is 400 nm to $\lambda P_1$ nm and $\lambda P_2$ nm to 700 nm. Since the second wavelength region has the flat reflectance property, the mean R within 400 nm to $\lambda P_1$ nm and $\lambda P_2$ nm to 700 nm is smaller than or equal to 5%.

As shown in FIG. 2C, the third reflection surface $22c$ is designed such that a predetermined difference in reflectance (i.e., transmissivity) is defined between the reflectance (i.e., the transmissivity) at the valley of the first wavelength region (630 nm) and the average reflectance (i.e., the average transmissivity) in the second wavelength region. As the reflectance at the valley (630 nm) of the first wavelength region becomes smaller, the transmissivity for the superimposing light becomes higher, which contributes to enhance of the brightness of the superimposed information.

As described above, in this embodiment, by forming locally a low reflectance region (i.e., a high transmissivity region) in the first wavelength region, slight color change occurs in comparison with a half mirror having the flat reflectance property within the entire visible light region. However, since the finder optical system is not an optical system which is actually used for photographing, a color change to the extent that a user does not have uncomfortable feeling is acceptable. In this embodiment, the low reflectance is provided in a limited region and the flat reflectance is secured in the other region. Therefore, color of a level that can be adequately used for a finder optical system is realized. However, when the reflectance at the valley (630 nm) of the first wavelength region is extremely lowered, the spectral property of the subject light beam in the finder view changes in a not negligible level before and after reflection on the third reflection surface $22c$, and thereby the color of the subject image in the finder view changes, which might give uncomfortable feeling to a user. Furthermore, as the reflectance at the valley (630 nm) of the first wavelength region becomes lower, the change of reflectance between the valley (630 nm) and the second wavelength region becomes steeper. In this case, a problem arises that the reflectance property becomes easy to change due to a manufacturing error, and a permissible level of the manufacturing error becomes substantially small. For this reason, it is further preferable that the difference in reflectance between the reflectance at the valley (630 nm) of the first wavelength region and the reflectance (the average reflectance) of the second wavelength region falls within the range of 10% to 50%, and more preferably within the range of 10% to 35%.

FIG. 2D illustrates the half-value width of the first wavelength region. The half-value width of the first wavelength region is a width of the reflectance of the first wavelength region at the intermediate value between the reflectance (i.e., the transmissivity) at the valley (630 nm) of the first wavelength region and the average reflectance the average transmissivity) of the second wavelength region. When the half-value width of the first wavelength region is excessively large, the reflectance decreases within a wide wavelength range, and thereby the flatness of the reflectance over the visible light region largely deteriorates. As a result, color of the subject image in the finder view changes, which might give uncomfortable feeling to the user. On the other hand, the half-value width of the LED light is approximately 10 nm, and the manufacturing error of the emission light wavelength of an LED is also approximately 10 nm. In view of these circumstances, preferably, the half-value width of the first wavelength region falls within a range of 10 nm to 100 nm, and more preferably within a range of 10 nm to 50 nm. For the same reason, preferably, the first wavelength region (wavelength of $\lambda P_1$ nm to $\lambda P_2$ nm) falls within a range of 20 nm to 150 nm, and more preferably within a range of 20 nm to 130 nm.

As the average reflectance in the visible light region becomes higher, the brightness of the subject image in the finder view increases. Therefore, it is preferable that the average reflectance in the second wavelength region is high, and ideally is 100%. However, in order to obtain a high reflectance property, the number of required layers becomes extremely large, and thereby problems including increase of manufacturing difficulty, decrease of reproducibility of an optical property and increase of cost arise. Such tendency stands out particularly when the reflectance higher than 95% is required. For this reason, in view of securing a suitable brightness of the subject image in the finder view and the manufacturing problems, it is preferable that the average reflectance of the second wavelength region falls within a range of 70% to 95%.

As described above, in this embodiment, the third reflection surface 22c is configured to have the reflectance property where the reflectance lowers locally at the first wavelength region corresponding to the superimposing light relative to the other region (i.e., the transmissivity increases relative to the other region), while maintaining the flat reflectance in the second wavelength region. As a result, the brightness of the subject image and the brightness of the superimposed information can be independently improved and can be improved simultaneously, while suppressing change of color of the subject image in the finder view.

Hereafter, five concrete example of the reflectance property of the third reflection surface 22c and three comparative examples to be compared with the examples are explained. The following parameters are common to all the examples and the comparative examples described below.

| Visible Light Region | 400 nm to 700 nm |
|---|---|
| Material of Pentaprism 22 | BK7 (refractive index of 1.52) |

Light Source of Light Emission Unit 25a: LED Having Emission Wavelength of 630 nm Reflection Angle of Subject Light Beam in Third Reflection Surface 22c: 19.5°

The third reflection surface 22c of each of $1^{st}$ to $4^{th}$ examples and comparative examples 1 to 3 is formed of a lamination of two types of dielectric films including $SiO_2$ which is a low refractive index material (refractive index of 1.47) and $TiO_2$ which is a high refractive index material (refractive index of 2.35). On the other hand, in the third reflection surface 22c of the $5^{th}$ example, two types of materials including $SiO_2$ (refractive index of 1.47) and $MgF_2$ (refractive index of 1.39) are used as the low refractive index materials, and $TiO_2$ (refractive index of 2.35) is used as the high refractive index material. That is, the third reflection surface 22c of the $5^{th}$ example is formed of lamination of three types of dielectric films including $SiO_2$ and $MgF_2$ which are the low refractive index materials and $TiO_2$ which is the high refractive index material.

$1^{st}$ EXAMPLE

Figures 3A, 3B:
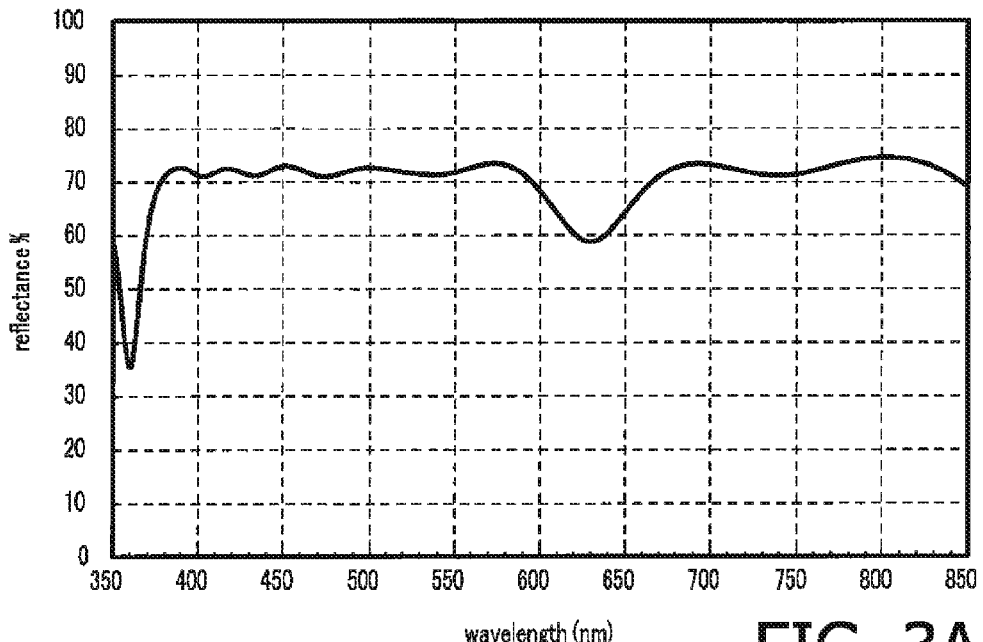
FIG. 3A is a graph illustrating a reflectance property of the third reflection surface according to a $1^{st}$ example.
FIG. 3B is a numeric table showing a lamination structure of the third reflection surface according to the $1^{st}$ example.

FIG. 3A is a graph illustrating the reflectance property of the third reflection surface 22c according to the $1^{st}$ example. In FIG. 3A, the vertical axis represents the reflectance (unit: %), and the horizontal axis represents the wavelength (unit: nm). FIG. 3B is a numeric table showing a lamination structure of the third reflection surface 22c according to the $1^{st}$ example. In FIG. 3B, the material, the refractive index and the physical film thickness (unit: nm) of each of layers forming the third reflection surface 22c are shown sequentially from the layer on the prism 25d side. The above described definitions regarding the figures of the example also apply to figures of the following examples and the comparative examples.

As shown in FIG. 3A, the reflectance lowers locally in the limited region around the wavelength of 630 nm (i.e., in the first wavelength region), and the reflectance takes a value of approximately 58.8% (transmissivity of approximately 41.2%) at the wavelength of 630 nm. The half-value width of the first wavelength region is approximately 46 nm. By contrast, the region within the visible light region other than the first wavelength region (i.e., the second wavelength region) has the flat reflectance property, and takes the average reflectance of approximately 72.1%. The difference in reflectance (i.e., the difference in transmissivity) between the first wavelength region and the second wavelength region is approximately 13.3%. The wavelengths $\lambda P_1$ and $\lambda P_2$ are approximately 573 nm and approximately 693 nm, respectively, and the first wavelength region has the width of approximately 120 nm.

$2^{nd}$ EXAMPLE

Figures 4A, 4B:
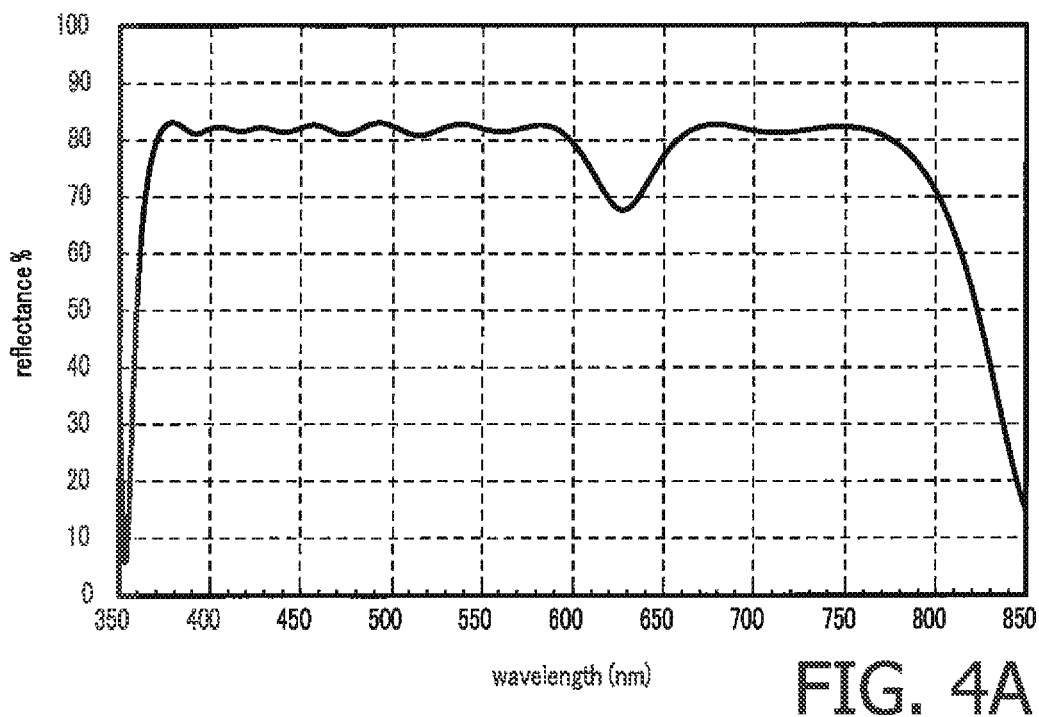
FIG. 4A is a graph illustrating a reflectance property of the third reflection surface according to a $2^{nd}$ example.
FIG. 4B is a numeric table showing a lamination structure of the third reflection surface according to the $2^{nd}$ example.

FIG. 4A is a graph illustrating the reflectance property of the third reflection surface 22c according to the $2^{nd}$ example. FIG. 4B is a numeric table showing a lamination structure of the third reflection surface 22c according to the $2^{nd}$ example. As shown in FIG. 4A, the reflectance lowers locally in the limited region around the wavelength of 630 nm (i.e., in the first wavelength region), and the reflectance takes a value of approximately 68.0% (transmissivity of approximately 32.0%) at the wavelength of 630 nm. The half-value width of the first wavelength region is approximately 36 nm. By contrast, the region within the visible light region other than the first wavelength region (i.e., the second wavelength region) has the flat reflectance property, and takes the average reflectance of approximately 82.1%. The difference in reflectance (i.e., the difference in transmissivity) between the first wavelength region and the second wavelength region is approximately 14.0%. The wavelengths $\lambda P_1$ and $\lambda P_2$ are approximately 582 nm and approximately 679 nm, respectively, and the first wavelength region has the width of approximately 97 nm. It should be noted that the reason that the difference in reflectance between the first wavelength region and the second wavelength region does not take the value of 14.1% is that each value is rounded off to one decimal place. Such notation also applies to the following explanations about the examples.

3$^{rd}$ EXAMPLE

Figures 5A, 5B:
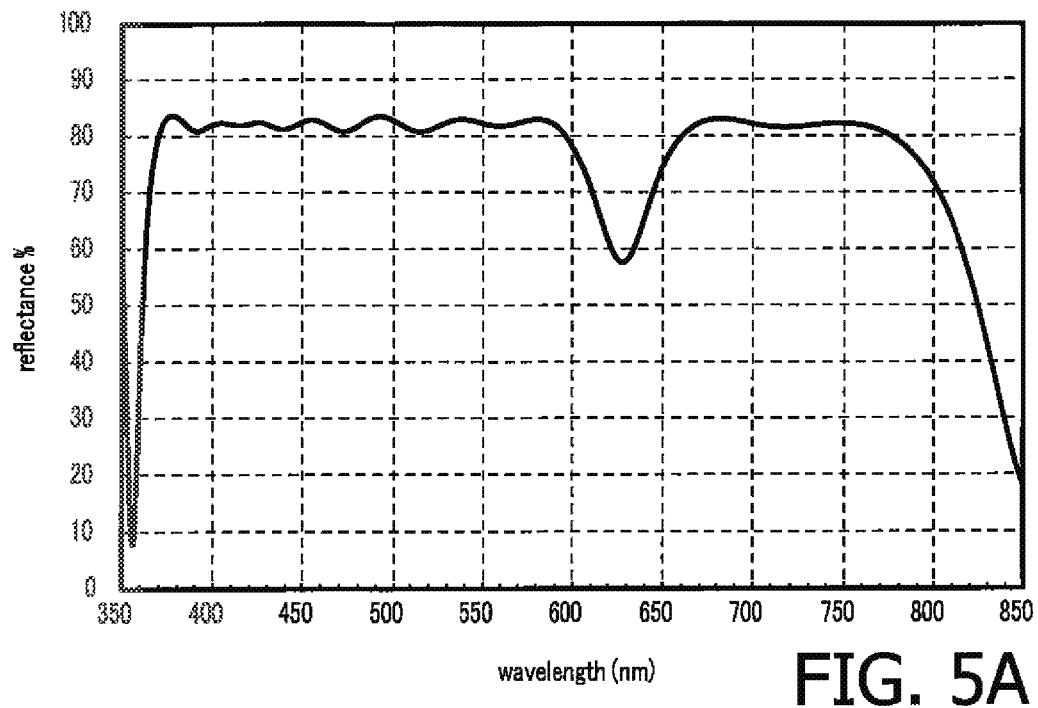
FIG. 5A is a graph illustrating a reflectance property of the third reflection surface according to a $3^{rd}$ example.
FIG. 5B is a numeric table showing a lamination structure of the third reflection surface according to the $3^{rd}$ example.

FIG. 5A is a graph illustrating the reflectance property of the third reflection surface 22c according to the 3$^{rd}$ example. FIG. 5B is a numeric table showing a lamination structure of the third reflection surface 22c according to the 3$^{rd}$ example. As shown in FIG. 5A, the reflectance lowers locally in the limited region around the wavelength of 630 nm (i.e., in the first wavelength region), and the reflectance takes a value of approximately 58.1% (transmissivity of approximately 41.9%) at the wavelength of 630 nm. The half-value width of the first wavelength region is approximately 33 nm. By contrast, the region within the visible light region other than the first wavelength region (i.e., the second wavelength region) has the flat reflectance property, and takes the average reflectance of approximately 82.1%. The difference in reflectance (i.e., the difference in transmissivity) between the first wavelength region and the second wavelength region is approximately 24.1%. The wavelengths $\lambda P_1$ and $\lambda P_2$ are approximately 580 nm and approximately 681 nm, respectively, and the first wavelength region has the width of approximately 101 nm.

4$^{th}$ EXAMPLE

Figures 6A, 6B:
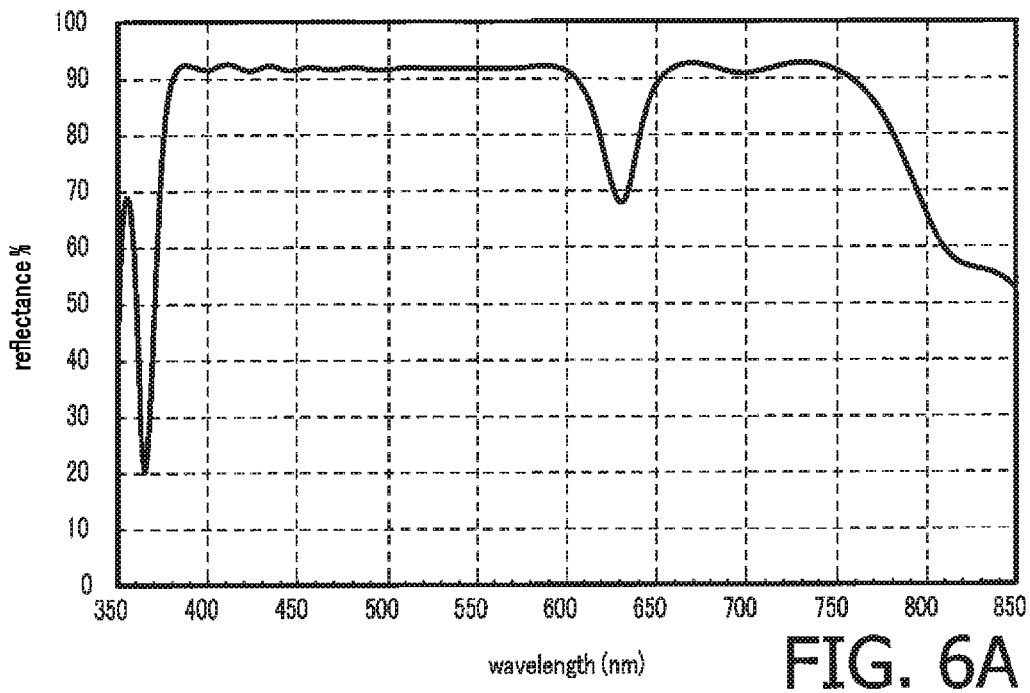
FIG. 6A is a graph illustrating a reflectance property of the third reflection surface according to a $4^{th}$ example.
FIG. 6B is a numeric table showing a lamination structure of the third reflection surface according to the $4^{th}$ example.

FIG. 6A is a graph illustrating the reflectance property of the third reflection surface 22c according to the 4$^{th}$ example. FIG. 6B is a numeric table showing a lamination structure of the third reflection surface 22c according to the 4$^{th}$ example. As shown in FIG. 6A, the reflectance lowers locally in the limited region around the wavelength of 630 nm (i.e., in the first wavelength region), and the reflectance takes a value of approximately 68.0% (transmissivity of approximately 32.0%) at the wavelength of 630 nm. The half-value width of the first wavelength region is approximately 22 nm. By contrast, the region within the visible light region other than the first wavelength region (i.e., the second wavelength region) has the flat reflectance property, and takes the average reflectance of approximately 92.0%. The difference in reflectance (i.e., the difference in transmissivity) between the first wavelength region and the second wavelength region is approximately 23.9%. The wavelengths $\lambda P_1$ and $\lambda P_2$ are approximately 588 nm and approximately 669 nm, respectively, and the first wavelength region has the width of approximately 81 nm.

5$^{th}$ EXAMPLE

Figures 7A, 7B:
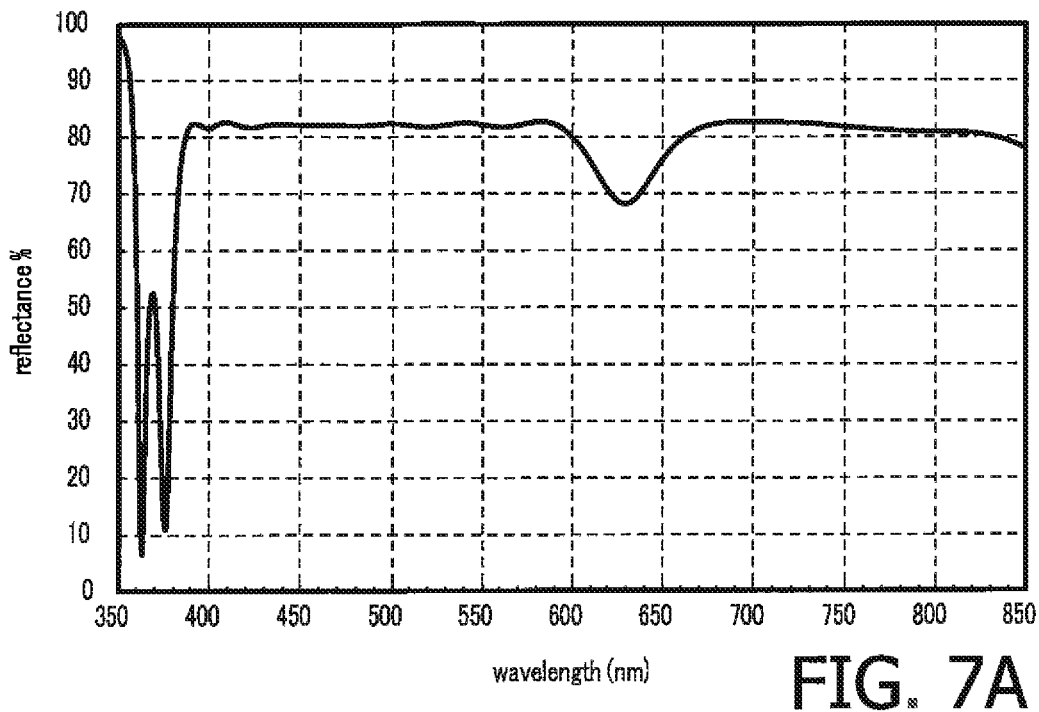
FIG. 7A is a graph illustrating a reflectance property of the third reflection surface according to a $5^{th}$ example.
FIG. 7B is a numeric table showing a lamination structure of the third reflection surface according to the $5^{th}$ example.

FIG. 7A is a graph illustrating the reflectance property of the third reflection surface 22c according to the 5$^{th}$ example. FIG. 7B is a numeric table showing a lamination structure of the third reflection surface 22c according to the 5$^{th}$ example. As shown in FIG. 7A, the reflectance lowers locally in the limited region around the wavelength of 630 nm (i.e., in the first wavelength region), and the reflectance takes a value of approximately 68.1% (transmissivity of approximately 31.9%) at the wavelength of 630 nm. The half-value width of the first wavelength region is approximately 36 nm. By contrast, the region within the visible light region other than the first wavelength region (i.e., the second wavelength region) has the flat reflectance property, and takes the average reflectance of approximately 82.0%. The difference in reflectance (i.e., the difference in transmissivity) between the first wavelength region and the second wavelength region is approximately 13.9%. The wavelengths $\lambda P_1$ and $\lambda P_2$ are approximately 582 nm and approximately 692 nm, respectively, and the first wavelength region has the width of approximately 110 nm.

COMPARATIVE EXAMPLE 1

Figures 8A, 8B:
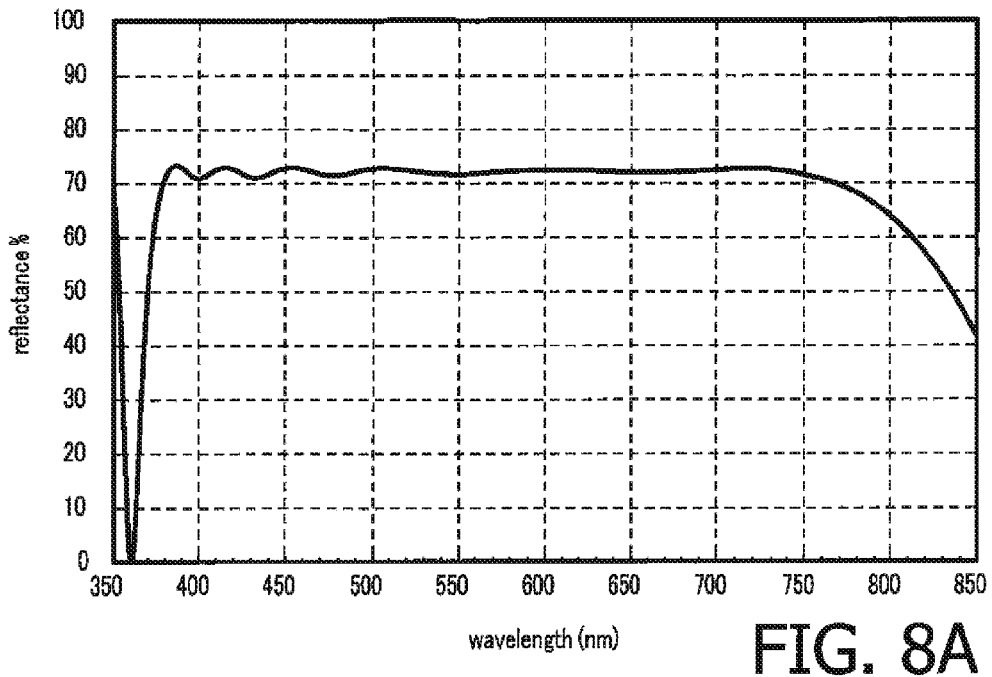
FIG. 8A is a graph illustrating a reflectance property of the third reflection surface according to a comparative example 1.
FIG. 8B is a numeric table showing a lamination structure of the third reflection surface according to the comparative example 1.

FIG. 8A is a graph illustrating the reflectance property of a third reflection surface according to the comparative example 1. FIG. 8B is a numeric table showing a lamination structure of the third reflection surface according to the comparative example 1. As shown in FIG. 8A, the third reflection surface according to the comparative example 1 has the flat reflectance property (the average reflectance: approximately 72.0%) in the visible light region (400 nm to 700 nm). The reflectance takes a value of approximately 72.2% (transmissivity of approximately 27.8%) at the wavelength of 630 nm.

COMPARATIVE EXAMPLE 2

Figures 9A, 9B:
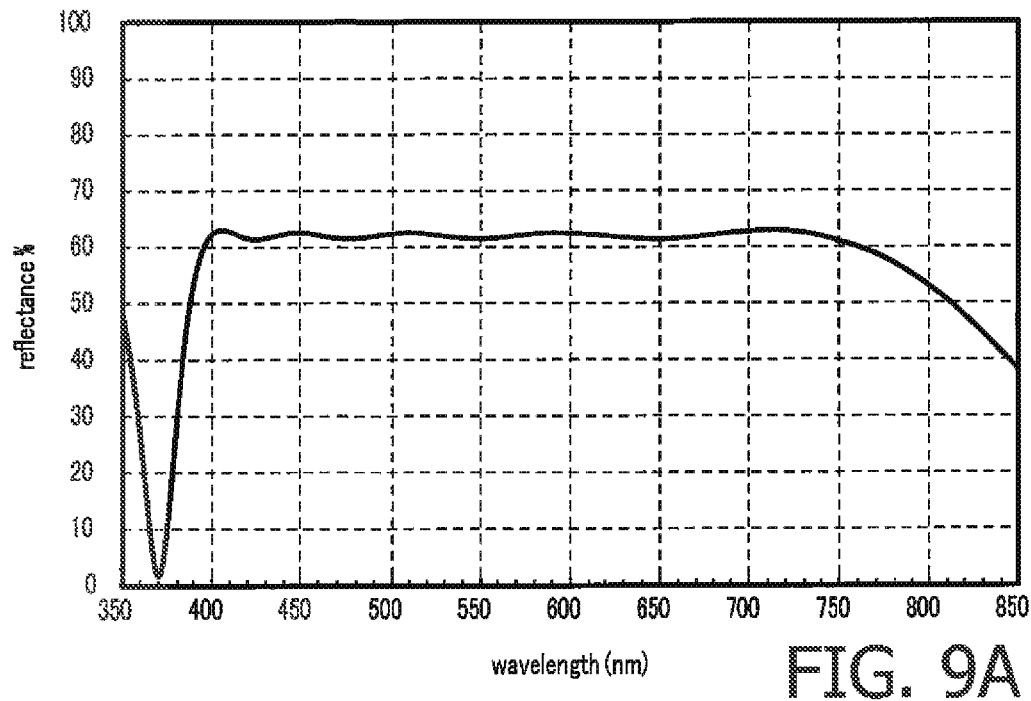
FIG. 9A is a graph illustrating a reflectance property of the third reflection surface according to a comparative example 2.
FIG. 9B is a numeric table showing a lamination structure of the third reflection surface according to the comparative example 2.

FIG. 9A is a graph illustrating the reflectance property of a third reflection surface according to the comparative example 2. FIG. 9B is a numeric table showing a lamination structure of the third reflection surface according to the comparative example 2. As shown in FIG. 9A, the third reflection surface according to the comparative example 2 has the flat reflectance property (the average reflectance: approximately 62.0%) in the visible light region (400 nm to 700 nm). The reflectance takes a value of approximately 61.7% (transmissivity of approximately 38.3%) at the wavelength of 630 nm.

COMPARATIVE EXAMPLE 3

Figures 10A, 10B:
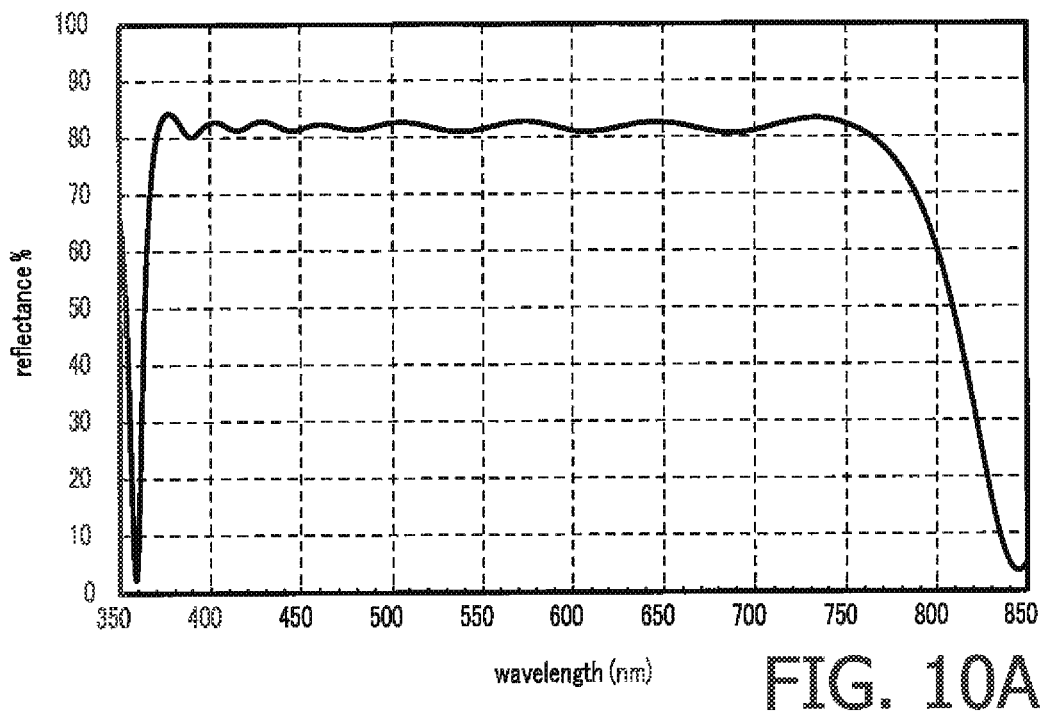
FIG. 10A is a graph illustrating a reflectance property of the third reflection surface according to a comparative example 3.
FIG. 10B is a numeric table showing a lamination structure of the third reflection surface according to the comparative example 3.

FIG. 10A is a graph illustrating the reflectance property of a third reflection surface according to the comparative example 3. FIG. 10B is a numeric table showing a lamination structure of the third reflection surface according to the comparative example 3. As shown in FIG. 10A, the third reflection surface according to the comparative example 3 has the flat reflectance property (the average reflectance: approximately 81.9%) in the visible light region (400 nm to 700 nm). The reflectance takes a value of approximately 81.9% (transmissivity of approximately 18.1%) at the wavelength of 630 nm.

Comparison and Analysis

Since, in each of the comparative examples 1 to 3, a half mirror having the flat reflectance property within the entire visible light region is used, change of color of a subject image in a finder view is suppressed. However, in the comparative example 1, the transmissivity at the wavelength of 630 nm is low, and therefore the brightness of superimposed information in the finder view is insufficient. In the comparative example 2, the brightness of the superimposed information in the finder view is enhanced by increasing the transmissivity at the wavelength of 630 nm by setting the average reflectance in the visible light region to be lower than the comparative example 1. However, in compensation for increasing the transmissivity, the brightness of the subject image in the finder view becomes insufficient. On the other hand, in the comparative example 3, the brightness of the subject image in the finder view is enhanced by setting the average reflectance in the visible light region to be higher than the comparative example 1. However, in compensation for this, the transmissivity at the wavelength of 630 nm becomes further lower than that of the comparative example 1, and therefore the brightness of the superimposed information in the finder view becomes insufficient further.

As described above, the half mirror used in each of the comparative examples 1 to 3 is not able to independently improve the brightness of the subject image and the brightness of the superimposed information in the finder view or simultaneously improve the brightness of the subject image and the brightness of the superimposed information in the finder view because the brightness of the subject image and the brightness of the superimposed information in the finder view are in a trade-off relationship. By contrast, according to the $1^{st}$ to $5^{th}$ examples, the brightness of the subject image and the brightness of the superimposed information in the finder view can be independently improved and can be simultaneously improved.

In the $1^{st}$ example, the average reflectance of the second wavelength region is approximately equal to the average reflectance of the visible light region in the comparative example 1. Therefore, in the $1^{st}$ example, the brightness of the subject image in the finder view is enhanced as in the case of the comparative example 1. Furthermore, since the reflectance property according to the $1^{st}$ example has the first wavelength region which corresponds to the wavelength of the superimposed light and whose transmissivity is higher than that of the second wavelength region, the brightness of the superimposed information in the finder view is improved. Specifically, the transmissivity at the wavelength of 630 nm is increased by 10% or more relative to the transmissivity of the second wavelength region, and the brightness of the superimposed information in the finder view is enhanced by 10% or more relative to the comparative example 1. Furthermore, the difference in reflectance between the first wavelength region and the second wavelength region falls within the range of 10% to 50% (approximately 13.3%), and the half-value width of the first wavelength region falls within the range of 10 nm to 100 nm (approximately 46 nm). Furthermore, the first wavelength region (the wavelength of $\lambda P_1$ to $\lambda P_2$) falls within the range of 20 nm to 150 nm (approximately 120 nm). Therefore, change of color of the subject image in the finder view is suppressed within the permissible level, which does not give uncomfortable feeling to the user.

In another aspect, since the $1^{st}$ example has the same transmissivity at the wavelength of 630 nm, as that of the comparative example 2, the brightness of the superimposed information in the finder view is improved. Furthermore, since the $1^{st}$ example has the second wavelength region having the reflectance higher than that of the first wavelength region, the brightness of the subject image in the finder view is enhanced. Specifically, the average reflectance of the second wavelength region is higher by 10% or more than the reflectance at the wavelength of 630 nm, and the brightness of the subject image in the finder view is enhanced by 10% or more relative to the comparative example 2.

In the $2^{nd}$ example, the average reflectance of the second wavelength region is approximately equal to the average reflectance of the visible light region in the comparative example 3. Therefore, in the $2^{nd}$ example, the brightness of the subject image in the finder view is enhanced as in the case of the comparative example 3. Furthermore, since the reflectance property according to the $2^{nd}$ example has the first wavelength region which corresponds to the wavelength of the superimposed light and whose transmissivity is higher than that of the second wavelength region, the brightness of the superimposed information in the finder view is improved. Specifically, the transmissivity at the wavelength of 630 nm is increased by 10% or more relative to the transmissivity of the second wavelength region, and the brightness of the superimposed information in the finder view is improved by 10% or more relative to the comparative example 3. Furthermore, the difference in reflectance between the first wavelength region and the second wavelength region falls within the range of 10% to 50% (approximately 14.0%), and the half-value width of the first wavelength region falls within the range of 10 nm to 100 nm (approximately 36 nm). Furthermore, the first wavelength region (the wavelength of $\lambda P_1$ to $\lambda P_2$) falls within the range of 20 nm to 150 nm (approximately 97 nm). Therefore, change of color of the subject image in the finder view is suppressed within the permissible level, which does not give uncomfortable feeling to the user.

In the $3^{rd}$ example, the average reflectance of the second wavelength region is approximately equal to the average reflectance of the visible light region in the comparative example 3. Therefore, in the $3^{rd}$ example, the brightness of the subject image in the finder view is enhanced as in the case of the comparative example 3. Furthermore, since the reflectance property according to the $3^{rd}$ example has the first wavelength region which corresponds to the wavelength of the superimposed light and whose transmissivity is higher than that of the second wavelength region, the brightness of the superimposed information in the finder view is improved. Specifically, the transmissivity at the wavelength of 630 nm is increased by 20% or more relative to the transmissivity of the second wavelength region, and the brightness of the superimposed information in the finder view is improved by 20% or more relative to the comparative example 3. Furthermore, the difference in reflectance between the first wavelength region and the second wavelength region falls within the range of 10% to 50% (approximately 24.1%), and the half-value width of the first wavelength region falls within the range of 10 nm to 100 nm (approximately 33 nm). Furthermore, the first wavelength region (the wavelength of $\lambda P_1$ to $\lambda P_2$) falls within the range of 20 nm to 150 nm (approximately 101 nm). Therefore, change of color of the subject image in the finder view is suppressed within the permissible level, which does not give uncomfortable feeling to the user.

In the $4^{th}$ example, the average reflectance of the second wavelength region is enhanced by approximately 10% relative to the average reflectance of the visible light region in the comparative example 3. Therefore, in the $4^{th}$ example, the brightness of the subject image in the finder view is enhanced further relative to the comparative example 3. Furthermore, since the reflectance property according to the $4^{th}$ example has the first wavelength region which corresponds to the wavelength of the superimposed light and whose transmissivity is higher than that of the second wavelength region, the brightness of the superimposed information in the finder view is improved. Specifically, the transmissivity at the wavelength of 630 nm is increased by 20% or more relative to the transmissivity of the second wavelength, region, and the brightness of the superimposed information in the finder view is improved by 10% or more relative to the comparative example 3. Furthermore, the difference in reflectance between the first wavelength region and the second wavelength region falls within the range of 10% to 50% (approximately 23.9%), and the half-value width of the first wavelength region falls within the range of 10 nm to 100 nm (approximately 22 nm). Furthermore, the first wavelength region (the wavelength of $\lambda P_1$ to $\lambda P_2$) falls within the range of 20 nm to 150 nm (approximately 81 nm). Therefore, change of color of the subject image in the finder view is suppressed within the permissible level, which does not give uncomfortable feeling to the user.

The 5$^{th}$ example has the same reflectance property as that of the 2$^{nd}$ example. However, as described above, in contrast to the other examples, the 5$^{th}$ example is configured such that the third reflection surface 22c is formed by the lamination structure of the three dielectric films including $SiO_2$ and $MgF_2$ which are the low refractive index materials and TiO2 which is the high refractive index material. By thus introducing $MgF_2$ as the low refractive index, material, ripple of the reflectance property reduces, the flatness of the reflectance property enhances and as a result the number of lamination layers decreases, with respect to the 2$^{nd}$ example. In general, since $MgF_2$ has a large membrane stress, $MgF_2$ is not used for a multilayer coating. However, by introducing $MgF_2$ in a small ratio with respect to a configuration having a relatively small number of lamination layers (e.g., less than or equal to ⅓ of the total number of layers), advantages that an excellent spectral property can be achieved by a small number of layers are obtained.

The foregoing is the exemplary embodiment of the invention. It is understood that the invention is not limited to the above described embodiment, but can be varied within the scope of the invention. For example, combinations of the above described exemplary embodiment and variations derived therefrom are also included in the scope of the invention.

For example, in the above described embodiment, the third reflection surface 22c of the pentaprism 22 is defined as a half mirror surface. However, in another embodiment, another surface, such as the dach surface 22b may be defined as a half mirror surface having the same reflectance property as that of the third reflection surface 22c. In this case, the superimposing unit 25 lets the superimposing light enter the pentaprism 22 at a predetermined angle via the dach surface 22b so that ranging points and the like are superimposed on the subject image in the finder view.

It is understood that application of the half mirror surface according to the embodiment is not limited to the pentaprism, but the half mirror surface according to the embodiment may be applied to a prism of another type provided in a finder device, such as a trapezoid prism. The half mirror surface according to the embodiment may also be applied to an optical component of another type provided in a finder device, such as a penta-roof mirror.

The finder device 2 according to the embodiment is configured such that the superimposing light enters the pentaprism 22 via the third reflection surface 22c (the half mirror surface), proceeds in the pentaprism 22 toward the eyepiece 23 in a state where the superimposing light is superimposed on the subject image (an erect image which is guided to the eyepiece 23 after reflected from the third reflection surface 22c), and reaches the finder 24 via the eyepiece 23. That is, in the embodiment, the superimposing light is superimposed on the subject image by letting the superimposing light pass through the half mirror surface. By contrast, in another embodiment, the superimposing light may be superimposed on the subject image by letting the superimposing light reflect from the half mirror surface.

Figure 12:
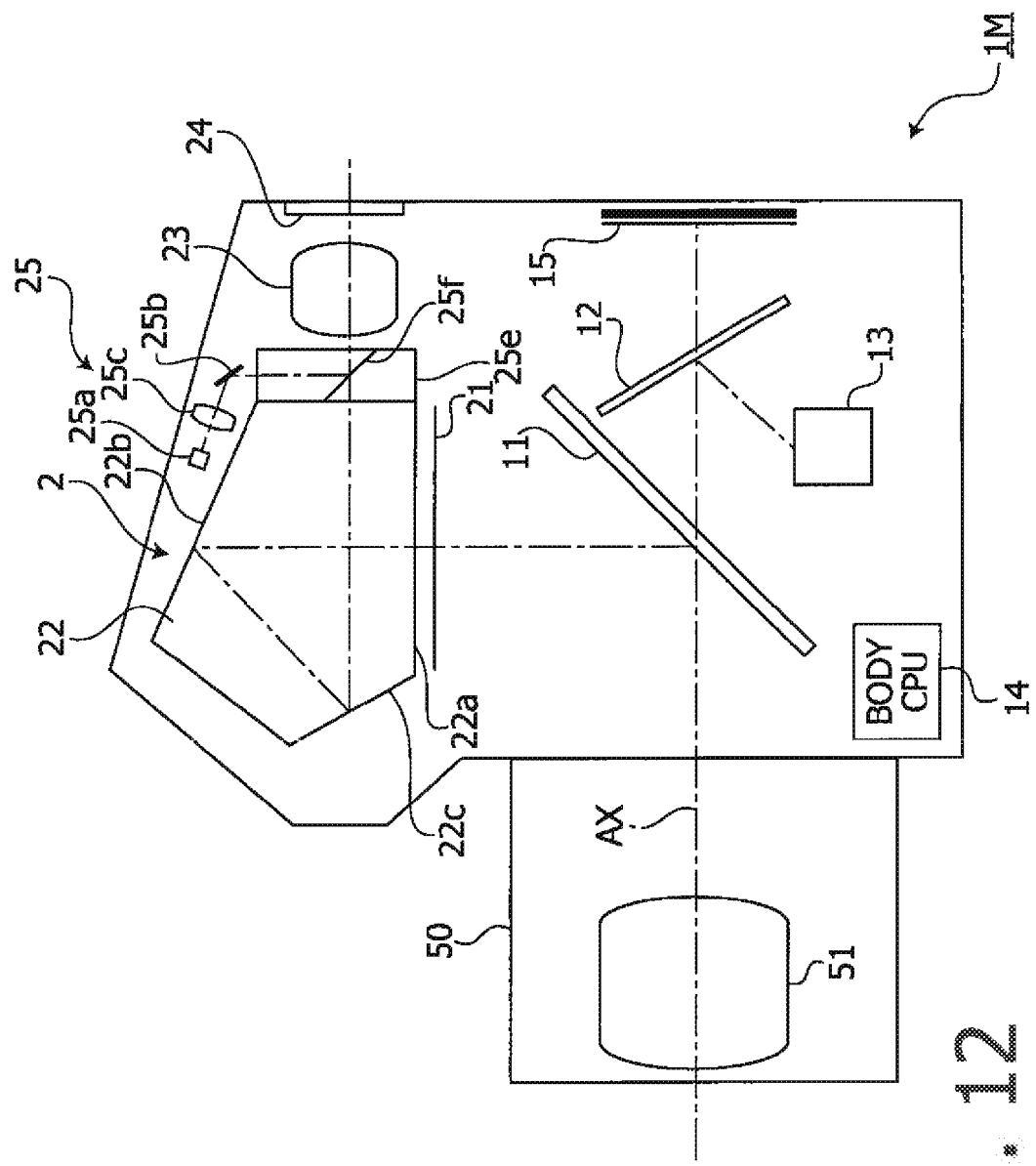
FIG. 12 is a block diagram illustrating a configuration of a photographing device on which a finder device according to another embodiment of the invention is mounted.

FIG. 12 is a block diagram illustrating a configuration of a photographing device on which a finder device 1M according to another embodiment is mounted. As shown in FIG. 12, the finder device 1M is configured such that the position and the configuration of the superimposing unit 25 are different from those of the above described embodiment. Specifically, the superimposing unit 25 of the finder device 1M is disposed near the dach surface 22b, and includes the light emission unit 25a, the mirror 25b, the condenser lens 25c and a prism 25e. The superimposing light emitted by the light emission unit 25a is reflected by the mirror 25b while being converged by the condenser lens 25c, and then is incident on the prism 25e. The prism 25e is formed by bonding two prisms together, and a bonded surface is formed as a half mirror surface 25f. The superimposing light which has entered the prism 25e is reflected from the half mirror surface 25f. At this time, the superimposing light is superimposed on an erect image of the subject which has passed through the half mirror surface 25f after emerging from the pentaprism 22. The combined superimposing light and the subject image reach the finder 24 via the eyepiece 23. As a result, the photographer is able to observe the subject image on which the ranging points and the like are superimposed via the finder 24.

In this embodiment, the half mirror surface 25f of the prism 25e is configured such that the half mirror surface 25f has the flat transmissivity property in a major part of the visible light region and the transmissivity lowers locally with respect to the other region (i.e., the reflectance becomes higher than the other region) at the wavelength region corresponding to the superimposing light. Specifically, the transmissivity property of the half mirror surface 25f has the first wavelength region and the second wavelength region in the visible light region (400 nm to 700 nm) as in the case of the above described embodiment. The first wavelength region has the width defined by a pair of inflection points sandwiching the peak of the transmissivity (wavelength of 630 nm). The second wavelength region lies over the entire visible light region (400 nm to 700 nm) except the first wavelength region, and has the flat transmissivity property. Preferably, as in the case of the above described embodiment, the difference in transmissivity (i.e., the difference in reflectance) between the transmissivity of the peak (630 nm) of the first wavelength region and the transmissivity (the average transmissivity) of the second wavelength region falls within the range of 10% to 50%, and more preferably the difference in transmissivity falls within the range of 10% to 35%. As in the case of the above described embodiment, preferably, the half-value width of the first wavelength region falls within the range of 10 nm to 100 nm, and more preferably the half-value width of the first wavelength region falls within the range of 10 nm to 50 nm. For the same reason, preferably, the first wavelength region falls within the range of 20 nm to 150 nm, and more preferably the first wavelength region falls within the range of 20 nm to 130 nm. Furthermore, as in the case of the above described embodiment, preferably the average transmissivity of the second wavelength region falls within the range of 70% to 95%, considering securing of the brightness of the subject image in the finder view and the manufacturing problem.

As in the above described embodiment, according to the embodiment shown in FIG. 12, it is possible to independently improve the brightness of the subject image and the brightness of the superimposed information and to simultaneously improve the brightness of the subject image and the brightness of the superimposed information, while suppressing change of color of the subject image in the finder view.

This application claims priority of Japanese Patent Application No. 2012-275417, filed on Dec. 18, 2012. The entire subject matter of the application is incorporated herein by reference.

What is claimed is:

1. An optical device for forming an image of an object, comprising:
   a semitransparent mirror surface disposed on an optical path along which light of the image of the object proceeds; and
   a light projection unit configured to project light to the semitransparent mirror surface and thereby to combine, on the optical path, the light projected by the light projection unit and transmitting through the semitransparent mirror surface with the image of the object reflecting from the semitransparent mirror surface,
   wherein:
      a first wavelength region is defined in a visible light region to include a wavelength of the light projected by the light projection unit;
      the semitransparent mirror surface has a substantially flat reflectance property within a second wavelength region which is defined in the visible light region not to include the first wavelength region; and
      transmissivity of the semitransparent mirror surface at the wavelength of the light projected by the light projection unit is higher by 10% to 50% than transmissivity in the second wavelength region; and
   wherein the semitransparent mirror surface has a reflectance property in the first wavelength region with a valley, such that a transmissivity of the semitransparent mirror surface for the light projected by the light projection unit becomes higher locally at a wavelength corresponding to the valley.

2. The optical device according to claim 1;
   wherein average reflectance of the second wavelength region is 70% to 95%.

3. The optical device according to claim 1;
   wherein:
      a reflectance property of the semitransparent mirror surface in the first wavelength region further has an inflection point on a shorter wavelength side with respect to the valley, and an inflection point of a longer wavelength side with respect to the valley; and
      the first wavelength region is defined such that a lower limit is a wavelength corresponding to the inflection point on the shorter wavelength side and an upper limit is a wavelength corresponding to the inflection point on the longer wavelength side.

4. The optical device according to claim 1;
   wherein the first wavelength region has a width of 20 nm to 150 nm.

5. The optical device according to claim 1;
   wherein transmissivity of the first wavelength region has a half-value width of 10 nm to 100 nm.

6. The optical device according to claim 1;
   wherein the optical device is configured as a finder device comprising an erecting optical system that has a plurality of reflection surfaces on the optical path along which the light of the image of the object proceeds; and
   wherein the erecting optical system is configured such that:
      one of the plurality of reflection surfaces is defined as the semitransparent mirror surface; and
      the image of the object entering the finder device from an objective optical system is guided, as an erect image, to a finder by letting the image of the object entering the finder device from the objective optical system reflect from each of the plurality of reflection surfaces.

7. The optical device according to claim 6;
   wherein:
      the erecting optical system comprises a pentaprism; and
      the light projection unit is configured to let the light projected by the light projection unit enter the pentaprism via the semitransparent mirror surface and thereby to let the light projected by the light projection unit be combined with the erect image being guided to the finder in the pentaprism.

8. The optical device according to claim 7;
   wherein the pentaprism comprises:
      an entrance surface on which an object light beam from the objective optical system is incident;
      a dach surface that reflects the object light beam being incident on the entrance surface; and
      a third reflection surface which reflects, toward the finder, the object light beam reflected by the dach surface; and
   wherein the third reflection surface is the semitransparent mirror surface.

9. The optical device according to claim 1;
   wherein the semitransparent mirror surface is formed by forming a dielectric multilayer film.

10. The optical device according to claim 1;
    wherein:
       the optical device is configured as a finder device; and
       an image combined by the light projected by the light projection unit on the image of the object represents supplementary information concerning photographing.

11. The optical device according to claim 10;
    wherein the supplementary information concerning photographing includes information concerning a ranging point, an in-focus state and an in-focus position.

12. An optical device for forming an image of an object, comprising:
    a semitransparent mirror surface disposed on an optical path along which light of the image of the object proceeds; and
    a light projection unit configured to project light to the semitransparent mirror surface and thereby to combine, on the optical path, the light projected by the light projection unit and reflecting from the semitransparent mirror surface with the image of the object transmitting through the semitransparent mirror surface,
    wherein;
       a first wavelength region is defined in a visible light region to include a wavelength of the light projected by the light projection unit;
       the semitransparent mirror surface has a substantially flat transmissivity property within a second wavelength region which is defined in the visible light region not to include the first wavelength region; and
       reflectance of the semitransparent mirror surface at the wavelength of the light projected by the light projection unit is higher by 10% to 50% than reflectance in the second wavelength region; and
    wherein the semitransparent mirror surface has a reflectance property in the first wavelength region with a peak, such that a reflectance of the semitransparent mirror surface for the light projected by the light projection unit becomes higher locally at a wavelength corresponding to the peak.

13. The optical device according to claim 12;
    wherein average transmissivity of the second wavelength region is 70% to 95%.

14. The optical device according to claim 12;
    wherein the first wavelength region has a width of 20 nm to 150 nm.

15. The optical device according to claim 12;
wherein transmissivity of the first wavelength region has a half-value width of 10 nm to 100 nm.

16. The optical device according to claim 12;
wherein the semitransparent mirror surface is formed by forming a dielectric multilayer film.

17. The optical device according to claim 12;
wherein:
 the optical device is configured as a finder device; and
 an image combined by the light projected by the light projection unit on the image of the object represents supplementary information concerning photographing.

18. The optical device according to claim 17;
wherein the supplementary information concerning photographing includes information concerning a ranging point, an in-focus state and an in-focus position.

19. A single lens reflex camera, comprising:
an objective optical system; and
a finder device;
wherein the finder device comprises:
 a semitransparent mirror surface disposed on an optical path along which light of an image of an object proceeds; and
 a light projection unit configured to project light to the semitransparent mirror surface and thereby to combine, on the optical path, the light projected by the light projection unit and transmitting through the semitransparent mirror surface with the image of the object reflecting from the semitransparent mirror surface;
wherein:
 a first wavelength region is defined in a visible light region to include a wavelength of the light projected by the light projection unit;
 the semitransparent mirror surface has a substantially flat reflectance property within a second wavelength region which is defined in the visible light region not to include the first wavelength region; and
 transmissivity of the semitransparent mirror surface at the wavelength of the light projected by the light projection unit is higher by 10% to 50% than transmissivity in the second wavelength region; and
wherein the semitransparent mirror surface has a reflectance property in the first wavelength region with a valley, such that a transmissivity of the semitransparent mirror surface for the light projected by the light projection unit becomes higher locally at a wavelength corresponding to the valley.

20. A single lens reflex camera, comprising:
an objective optical system; and
a finder device;
wherein the finder device comprises:
 a semitransparent mirror surface disposed on an optical path along which light of an image of an object proceeds; and
 a light projection unit configured to project light to the semitransparent mirror surface and thereby to combine, on the optical path, the light projected by the light projection unit and reflecting from the semitransparent mirror surface with the image of the object transmitting through the semitransparent mirror surface;
wherein:
 a first wavelength region is defined in a visible light region to include a wavelength of the light projected by the light projection unit;
 the semitransparent mirror surface has a substantially flat transmissivity property within a second wavelength region which is defined in the visible light region not to include the first wavelength region; and
 reflectance of the semitransparent mirror surface at the wavelength of the light projected by the light projection unit is higher by 10% to 50% than reflectance in the second wavelength region; and
wherein the semitransparent mirror surface has a reflectance property in the first wavelength region with a peak, such that a reflectance of the semitransparent mirror surface for the light projected by the light projection unit becomes higher locally at a wavelength corresponding to the peak.

* * * * *